(12) United States Patent
Skinner et al.

(10) Patent No.: US 11,648,715 B2
(45) Date of Patent: May 16, 2023

(54) SYSTEM AND APPARATUS FOR FORMING A COLLAPSIBLE STRUCTURE MADE FROM EXPANDABLE MATERIAL

(71) Applicant: ICEE HOLDINGS PTY LTD, Tullamarine (AU)

(72) Inventors: Leslie John Skinner, Tullamarine (AU); Hamish Hingston, Tullamarine (AU)

(73) Assignee: ICEE HOLDING PTY LTD, Tullamarine (AU)

( * ) Notice: Subject to any disclaimer, the term of this patent is extended or adjusted under 35 U.S.C. 154(b) by 0 days.

(21) Appl. No.: 16/471,848

(22) PCT Filed: Dec. 22, 2017

(86) PCT No.: PCT/AU2017/000292
§ 371 (c)(1),
(2) Date: Jun. 20, 2019

(87) PCT Pub. No.: WO2018/112506
PCT Pub. Date: Jun. 28, 2018

(65) Prior Publication Data
US 2020/0086535 A1 Mar. 19, 2020

(30) Foreign Application Priority Data
Dec. 23, 2016 (AU) .................. 2016905357

(51) Int. Cl.
*B29C 44/58* (2006.01)
*B29C 44/44* (2006.01)
(Continued)

(52) U.S. Cl.
CPC .......... *B29C 44/585* (2013.01); *B29C 44/445* (2013.01); *B29C 45/78* (2013.01);
(Continued)

(58) Field of Classification Search
None
See application file for complete search history.

(56) References Cited

U.S. PATENT DOCUMENTS 5,126,093 A * 6/1992 Gelardi ............... B29C 45/0081
220/6
5,198,163 A 3/1993 Yamamoto et al.
(Continued)

FOREIGN PATENT DOCUMENTS

FR 2186348 1/1974
JP S51132279 11/1976
(Continued)

OTHER PUBLICATIONS

Translation of FR 2,186,348 ("Celpex") (Year: 1974).*
(Continued)

*Primary Examiner* — Xiao S Zhao
*Assistant Examiner* — John J DeRusso
(74) *Attorney, Agent, or Firm* — Merchant & Gould P.C.

(57) ABSTRACT

A mould for forming a collapsible container from an expandable material, the container comprising, at least a base and two pairs of a side walls extending at right angles from opposing sides of the base, the mould comprising: a first mould member and a second mould member movable with respect to each other between an open and a closed moulding position to define a mould cavity; and a plurality of anvils mounted on a rear surface of at least one of the first mould member and/or second mould member, each anvil being movable so as to be extended into the mould cavity so as to form one or more hinges in the expandable material at predetermined locations within the mould cavity; wherein the mould cavity defined by the first mould member and the second mould member is a three-dimensional representation of an inside-out configuration of the assembled container.

16 Claims, 8 Drawing Sheets

(51) Int. Cl.
  *B29L 31/22* (2006.01)
  *B29L 31/00* (2006.01)
  *B29C 45/78* (2006.01)
  *B65D 1/22* (2006.01)

(52) U.S. Cl.
  CPC .... *B65D 1/225* (2013.01); *B29C 2945/76531* (2013.01); *B29L 2031/22* (2013.01); *B29L 2031/712* (2013.01)

(56) References Cited

U.S. PATENT DOCUMENTS

| | | | |
|---|---|---|---|
| 6,558,592 | B1 | 5/2003 | Nohara et al. |
| 2016/0257042 | A1* | 9/2016 | Bazzica .............. B29C 45/0081 |

FOREIGN PATENT DOCUMENTS

| | | |
|---|---|---|
| JP | S63162458 | 7/1988 |
| JP | S63290720 | 11/1988 |
| JP | H4147833 | 5/1992 |
| WO | 2010111729 A1 | 10/2010 |
| WO | 2012028567 A1 | 3/2012 |
| WO | 2015056181 A1 | 4/2015 |
| WO | 2016023067 A1 | 2/2016 |

OTHER PUBLICATIONS

International Search Report for International Application No. PCT/AU2017/000292 dated Feb. 28, 2018 (5 pages).
International Written Opinion for International Application No. PCT/AU2017/000292 dated Feb. 28, 2018 (5 pages).

* cited by examiner

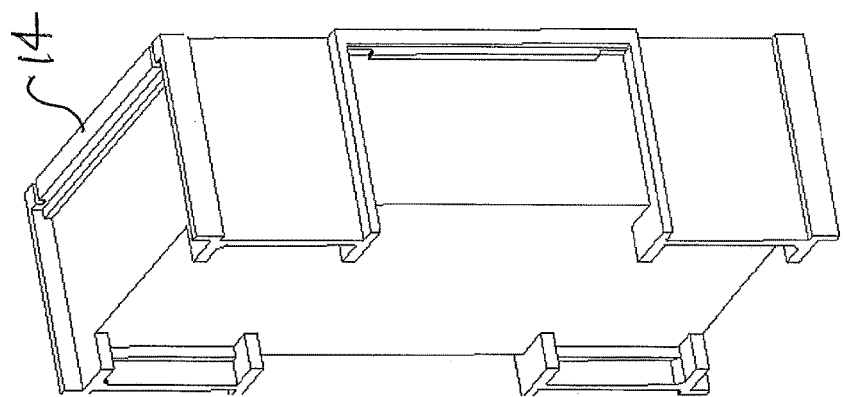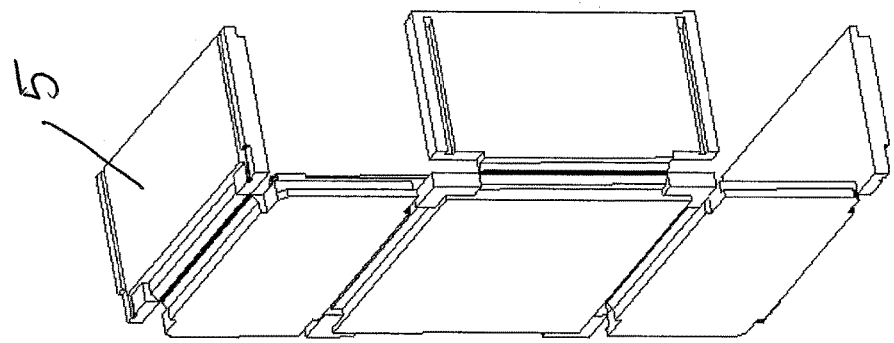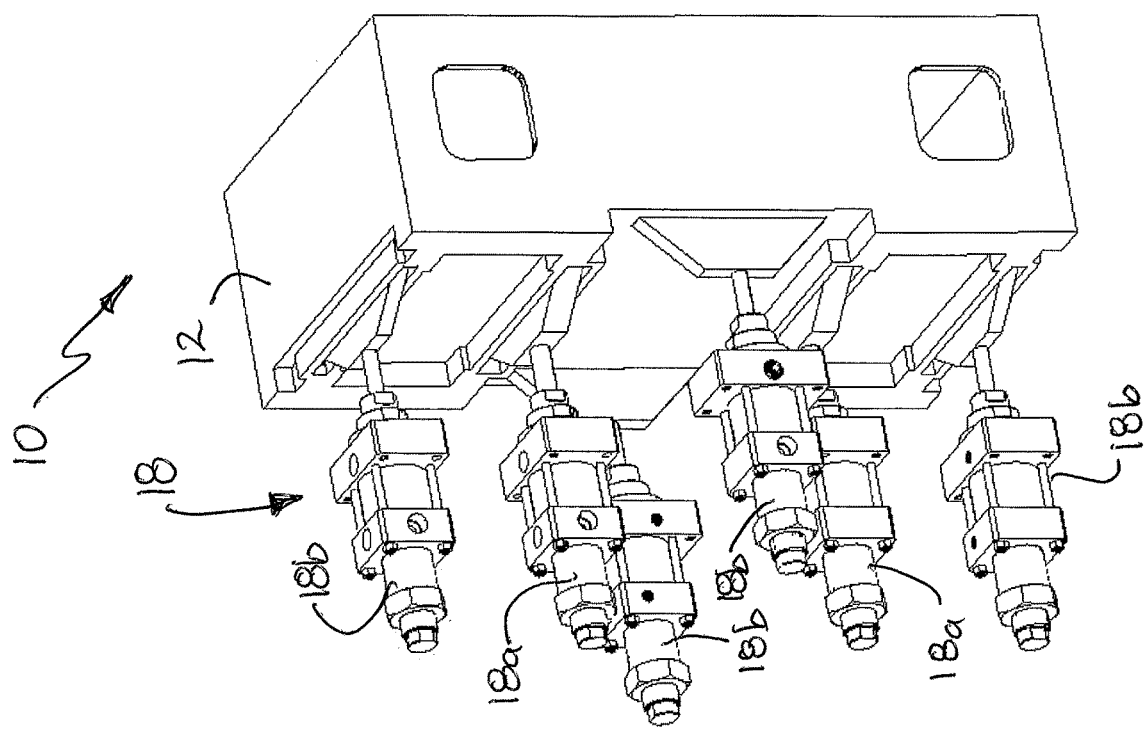
FIG. 2

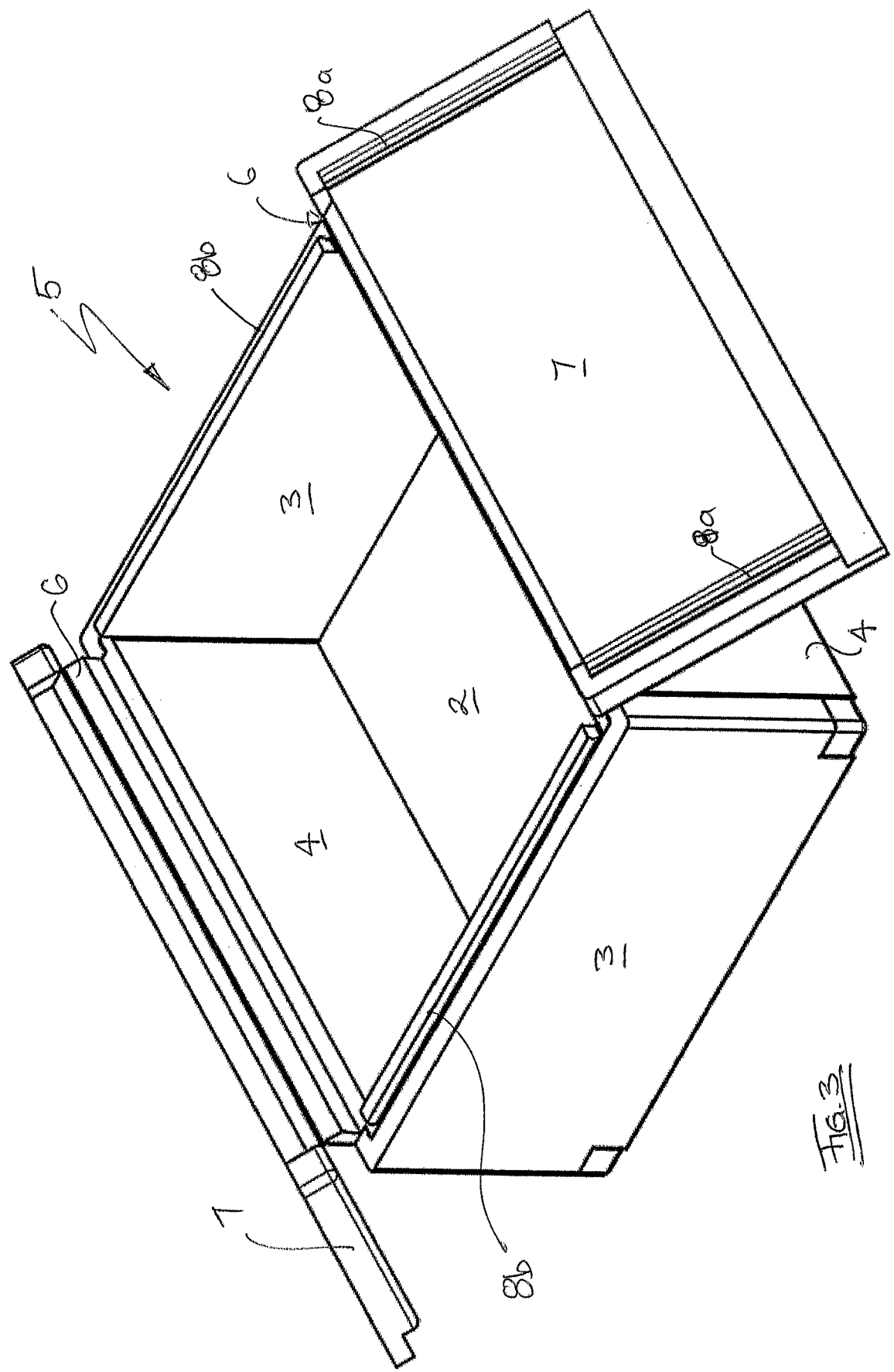

SYSTEM AND APPARATUS FOR FORMING A COLLAPSIBLE STRUCTURE MADE FROM EXPANDABLE MATERIAL

RELATED APPLICATIONS

The present application is a National Stage Application of PCT/AU2017/000292, filed 22 Dec. 2017, which claims benefit of Australian Provisional Patent Application No. 2016905357 filed 23 Dec. 2016 and which applications are incorporated herein by reference. To the extent appropriate, a claim of priority is made to each of the above disclosed applications.

FIELD OF INVENTION

The present invention relates generally to a system and apparatus for creating a structure from expandable material and in particular, to a system and apparatus for creating a collapsible box, or similar collapsible structure, from expandable material.

BACKGROUND OF THE INVENTION

Expandable material or rigid cellular plastics, such as expanded polystyrene (EPS), expanded polypropylene (EPP), and expanded polylactic acid (EPLA) exhibit a variety of useful properties that have numerous uses within society. Due to their durable and lightweight properties, such materials are particularly useful as packaging and containers to contain, transport and/or store a variety of goods.

With the continually widespread acceptance of rigid cellular plastics, such as EPS, EPP and EPLA, the ability to utilise these materials and their superior properties to provide a more durable and useful container and packaging solutions, is yet to be fully realised. In particular, rigid cellular plastics have useful application in the storage and transport of perishable materials, such as agricultural and horticultural products, as they are largely impermeable. As a result, such materials are able to provide an environment for storing items which can be temperature regulated and maintained in a gas-tight or water-tight state. Due to the nature of such materials, boxes formed from EPS, EPP and EPLA also offer a degree of shock and impact resistance that provides protection to the materials stored or carried therein.

However, despite the various benefits that rigid cellular plastics may offer for use in packaging purposes, due to the traditional manner in which the packaging products are formed from such materials, many of these advantages are offset by a number of number of problems associated with the formed packaging products. In particular, the formation of a box or similar packaging product generally requires controlled expansion of the material within a mould. As such, most boxes or packaging products are formed to assume a specific, three-dimensional shape, namely as a single piece. Whilst this has some useful applications and enables the formation of a dimensionally accurate final product, the resultant three-dimensional box or packaging product occupies a predetermined volume even when empty. Thus, there is constantly a need to have an available space in which to store the box/product when not in use. This results in a product that takes up a significant amount of space irrespective of whether it is being used or not, which makes such products less economic to store and transport when empty. Thus after use, it is not uncommon for EPS boxes to be destroyed, broken down and disposed of by being placed in land-fill and not being reused, despite their potential for such re-use.

A variety of systems have been proposed for making EPS boxes in a flat, blank form that can be assembled into a box for use. Such systems generally achieve this through the formation of hinges or fold regions in the blank during the moulding process and/or by applying a compression force to the blank following formation to form a hinge at a predetermined location. Unfortunately, inherent in using such a conventional means for achieving a fold region or hinge generally requires creating a region of weakness in the blank about which the planar regions of the blank on either sides of the weakness are able to be folded with respect to each other. Whilst such a system may provide a means for folding a planar piece of material into a box or the like, the direct result of creating an area of weakness in the blank to form the hinge is that it enhances the likelihood that the product will fail during use at the hinge region, thereby significantly compromising the integrity of the product and the contents stored therein.

One system and method for addressing this problem is described in more detail in the Applicant's International PCT Patent Application No. PCT/AU2010/000340. The system and method described therein employs a two-step process for achieving the fold region or hinge in the blank, with the first step comprising the moulding of the blank to form the overall shape of the hinge or fold region and the second step requiring further compressing the hinge or fold region so as to provide a strengthened hinge or fold region having compressed material located therein.

Whilst the Applicant's above described system and method has proven effective in enabling boxes to be assembled from a flat EPS blank, such a two-step process requires dedicated machinery and processes to replicate. Further, the moulds required to form such a flat blank must be considerably larger than conventional 3D moulds and have considerably larger surface areas, thereby reducing the thermal efficiency of the machine and moulding process.

Therefore, there is a need to provide an improved process for creating a collapsible blank for a box having an improved a hinge or fold region that enhances the strength of the material in the hinge or fold region and which maximises platen usage and space requirements as well as thermal efficiency of the moulding process whilst reduces the need to provide separate tooling and steps during the formation process.

The above references to and descriptions of prior proposals or products are not intended to be, and are not to be construed as, statements or admissions of common general knowledge in the art. In particular, the above prior art discussion does not relate to what is commonly or well known by the person skilled in the art, but assists in the understanding of the inventive step of the present invention of which the identification of pertinent prior art proposals is but one part.

STATEMENT OF INVENTION

The invention according to one or more aspects is as defined in the independent claims. Some optional and/or preferred features of the invention are defined in the dependent claims.

According to a first aspect of the present invention, there is provided a mould for forming a collapsible container from an expandable material, the container comprising, when assembled, at least a base and a two pairs of a side walls extending at right angles from opposing sides of the base, the mould comprising:

a first mould member and a second mould member movable with respect to each other between an open and a closed moulding position to define a mould cavity;

a control means for delivering expandable material into said mould cavity and for delivering steam to facilitate expansion of the expandable material within said mould cavity to form said container; and a plurality of anvils mounted on a rear surface of at least one of the first mould member and/or second mould member, each anvil being movable so as to be extended into the mould cavity so as to form one or more hinges in the expandable material at predetermined locations within the mould cavity;

wherein the mould cavity defined by the first mould member and the second mould member is three-dimensional representation of an inside-out configuration of the assembled container.

In one embodiment, the plurality of anvils may be mounted on a rear surface of the first mould member and/or second mould member such that they are each contained within a perimeter of the rear surface of the first mould member and/or second mould member.

Each or the anvils may be configured to be movable so as to apply substantially linear compression of the expandable material to form said hinges at the predetermined locations thereof.

At least one of the anvils may be a linear moving anvil that is activated to move in a linear direction to form said hinge at a predetermined location. The linear moving anvil may be mounted within a linear recess formed through either the first mould member and/or second mould member so as to extend into the mould cavity At least one of the anvils may be a rotary moving anvil that is activated to move in a rotary direction to form said hinge at a predetermined location. The rotary moving anvil may be mounted within an arcuate recess formed through either the first mould member and/or second mould member so as to extend into the mould cavity to apply substantially linear compression of the expandable material at the predetermined location.

According to a second aspect, there is provided an anvil for use in the mould of the first aspect, wherein the anvil has a head portion configured to extending into the moulding chamber to compress the expandable material to form the one or more hinges and the head portion is substantially hollow and configured to be connectable to a heating/cooling source so as to independently control the temperature of the head portion with respect to the mould.

According to a third aspect, there is provided a mould according to the first aspect, wherein the moulding chamber is configured to form a chamber within which the anvil travels such that the region of expandable material compressed by the anvil is isolated from the remainder of the hinge region.

BRIEF DESCRIPTION OF THE DRAWINGS

The invention may be better understood from the following non-limiting description of preferred embodiments, in which:

FIG. 2 is a left hand perspective view of sectional view of a mould in accordance with an embodiment of the present invention;

FIG. 3 is a partially assembled container formed from the mould of FIGS. 1 and 2;

DETAILED DESCRIPTION OF THE DRAWINGS

Preferred features of the present invention will now be described with particular reference to the accompanying drawings. However, it is to be understood that the features illustrated in and described with reference to the drawings are not to be construed as limiting on the scope of the invention.

The system and apparatus of the present invention will be described below in relation to its use with expanded polystyrene (EPS). However, it will be appreciated that the system and apparatus of the present invention could equally be employed for use with any type of expandable material or Rigid Cellular Plastic (RCP), including EPS as well as EPP, EPLA and the like. It will also be appreciated that whilst the system and apparatus of the present invention will be described below in relation to the formation of a box having a base, foldable sides connectable to the base by a hinge and a lid, the present invention could be employed to provide multiple fold regions or hinges in the planar portion of EPS to facilitate the formation of a box or any other desired shape.

Figure 1:
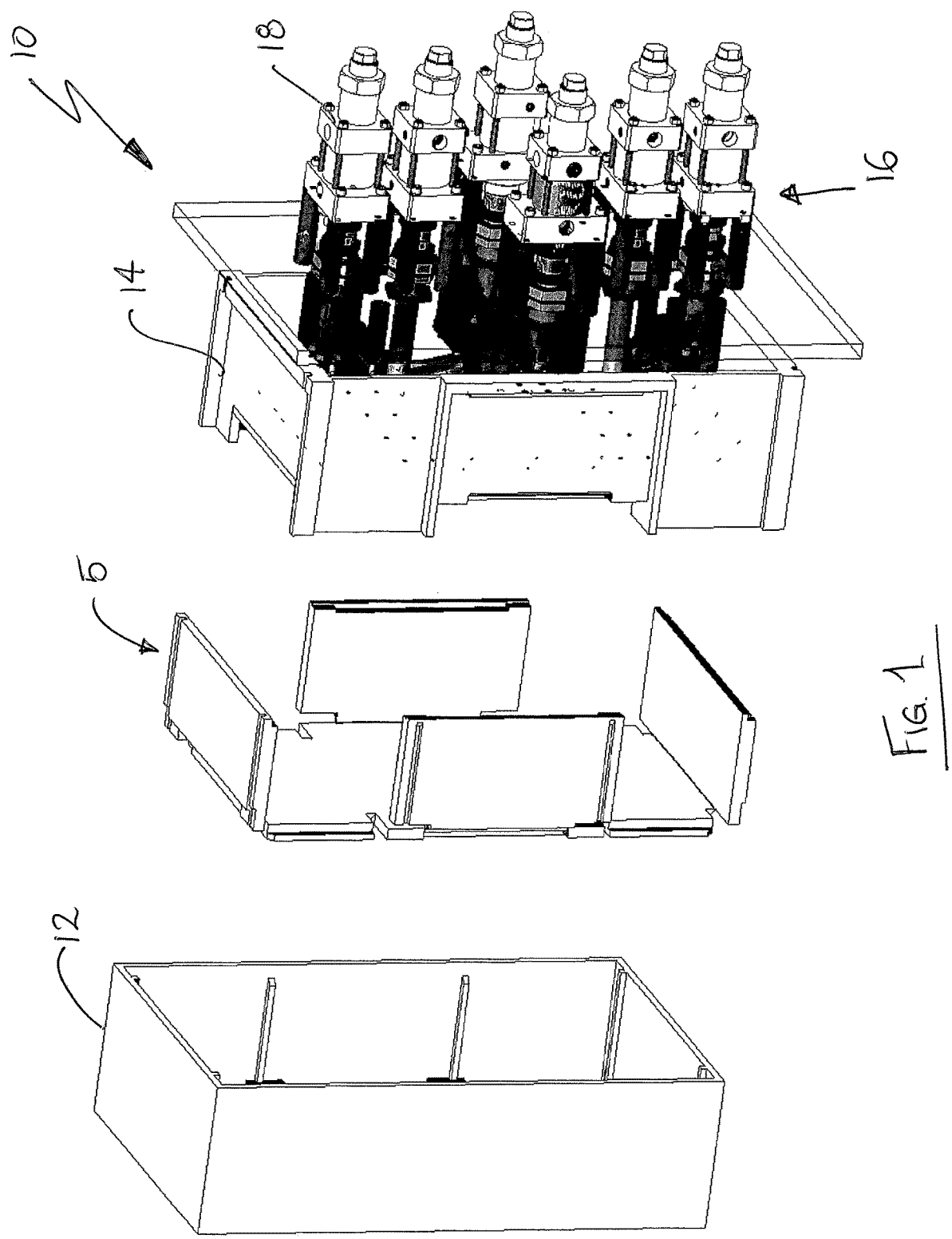
FIG. 1 is a right hand perspective view of sectional view of a mould in accordance with an embodiment of the present invention.

Referring to FIGS. 1 and 2, separate embodiments of a mould 10 for use on a machine (not depicted) for moulding EPS to produce a foldable container 5 in accordance with the present invention, is shown. The mould 10 is a two-piece mould and comprises a first mould member 12 and a second mould member 14. The first mould member 12 and the second mould member 14 are mounted to face each other on a frame of a machine so as to move with respect to each other between an open position (as shown in FIG. 1) and a closed moulding position, whereby the first mould member 12 and the second mould member 14 are brought together in a controlled manner to define the mould cavity 19 therebetween. The moulding cavity defines the shape of the foldable container 5 that is to be formed.

In this regard, the first mould member 12 is a female mould member and the second mould member 14 is a male mould member that is configured to be received within the female mould member 12 when in the closed moulding position. Thus, the internal walls of the first mould member 12 and the external walls of the second mould member 14 are configured to define the shape of the foldable container 5 formed from the mould 10.

In the embodiments of the mould 10 depicted in FIGS. 1 and 2, FIG. 1 depicts an arrangement whereby the rear surface of the second mould member 14 is fitted with componentry 16 associated with the machine (not shown), which may include nozzles and inlets for attachment to a material delivery system for delivering the pellets or beads of polystyrene as well as to a steam delivery system for delivering steam to facilitate expansion of the pellets or beads of polystyrene, as will be appreciated by those skilled in the art. In this embodiment the moveable anvils 18 for forming the fold regions in the container in accordance with the present invention is also mounted on the rear surface of the second mould member 14. As is shown in FIG. 2, an alternative embodiment is depicted whereby the rear surface of the first mould member 12 is fitted with the componentry and the one or more movable anvils 18 for forming each hinge region in the foldable container, in a manner to be described in more detail below. However, it will be appreciated that the componentry 16 and the anvils 18 may be mounted to an end of either mould member 12 or 14, or may be mounted to both ends of the mould members 12, 14. Irrespective of the manner in which the componentry 16 and anvils 18 are mounted, they are mounted such that they are fully retained within the perimeter of the mould 10 and do not extend outside the perimeter of the mould 10, to enable multiple moulds 10 to be arranged in an abutting manner within a machine, to maximise output and efficiency of the machine.

Referring to FIG. 3, a container 5 formed by the mould 10 in accordance with an embodiment of the present invention is shown in its assembled form with the lids in the open position. The container 5 is a substantially rectangular or square box having a base 2, a pair of side walls 3 extending along opposing sides of the base 2, and a pair of end walls 4 extending along the other opposing sides of the base 2. The end walls 4 and the side walls 3 are each attached to the base 2 by way of a hinge 6 that is formed during the moulding process. The manner in which the hinges 6 are formed will be described below and are also described in the Applicant's co-pending International Patent Application PCT/AU2015/00481, the contents of which are incorporated herein by reference.

Each of the side walls 3 and end walls 4 are configured to engage along their edges such that they form an upright box structure. As is shown in the embodiment of FIG. 3, each of the end walls 4 have a lid member 7 attached at an upper surface thereof by way of a hinge 6. This enables each lid member 7 to pivot into position to cover the opening of the container 5. The undersurface of the lid members 7 may have grooves 8a formed therein such that when the lid members 7 are pivoted into a closed position the grooves 8a engage with projections 8b provided on the upper ends of the side walls 3 to securely retain the lid members 7 in a closed position.

It will be appreciated that the container 5 as depicted in FIG. 3 has seven planar surfaces (two lid members 7, two side walls 3, two end walls 4 and a base 2) and six hinges provided between the planar surfaces to facilitate assembly of the container from a substantially flat form into the three-dimensional form. As will be appreciated by those skilled in the art, the shape and structure of the container 5 may change to assume a variety of different shapes. Similarly, the location of the lid members 7 may vary and in some instances only one lid member may be provided which covers the entire opening of the container 5. Alternatively, in some embodiments the container 5 may not require a lid member and is open.

In the embodiment of the mould 10 as shown in FIGS. 1 and 2, the container 5 is formed in a three dimensional manner, with the base 2 and end walls 4 in a first plane and the side walls 3 and lid members 7 in a second plane substantially perpendicular to the first plane. To facilitate the formation of the hinge members by the moving anvils 18, the container 5 is also formed in an inside-out manner, namely with the side walls 3 and lid members 7 folded back with respect to the end walls 4. By moulding the container 5 in such a configuration, the hinge members 6 are positioned adjacent the inner end surface of the mould member 12 to be formed during the moulding process by activation of the relevant moving anvils 18, as will be described in more detail below. It will be appreciated that by moulding the container 5 in this inside-out 3-Dimensional manner, the footprint of the mould/platen is able to be reduced for increased productivity and efficiency. In this regard whilst reference is made to a first plane and second plane, it will be appreciated that these planes could be vertical or horizontal depending upon the orientation of the machine and the present invention in not to be limited by such orientation. Similarly, the various parts of the blank being formed may not necessarily extend at right angles to other parts of the blank, other acute or obtuse angles may also be used.

As discussed above, each of the hinges 6 are formed in accordance with the method as described in the Applicant's co-pending International Patent Application PCT/AU2015/00481. In essence, this process involves a step of compressing expanded material into the hinge region during the moulding process, typically after the material has expanded but before the material has cooled. As is shown in FIG. 2, the compression is performed by way of anvils 18 which are movable into the mould chamber at the desired hinge region during the moulding process.

Referring to the embodiment of FIG. 2, the anvils 18 can each be grouped based on the location of the hinge 6 that they are to form. Anvils 18a are configured to form the central hinges 6, namely those hinges that are formed in a single plane. Anvils 18b are configured to form the edge hinges 6, namely those hinges that are formed at substantially 45° to the plane. The manner in which these different types of hinges 6 are formed by the different types of anvils 18 will be discussed in more detail below.

Figure 4B:
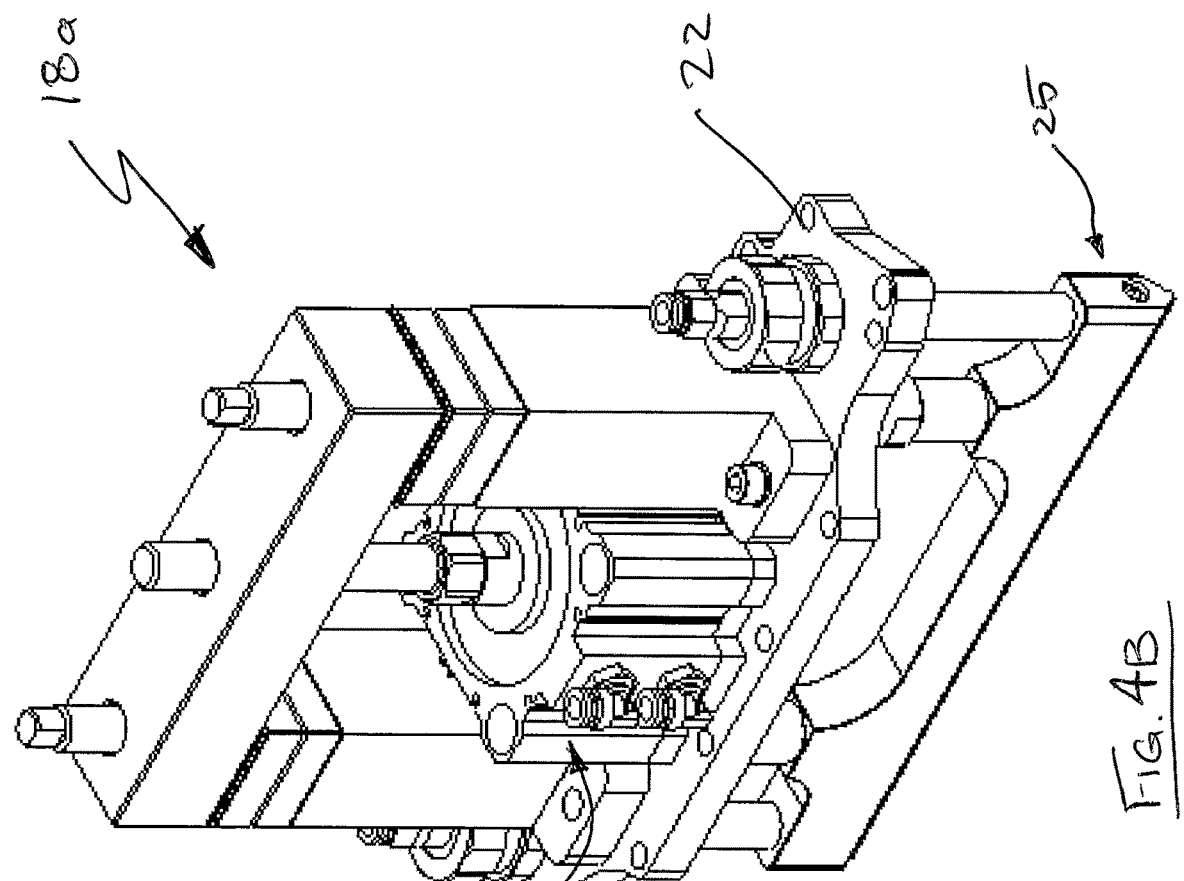
FIG. 4A and FIG. 4B show side and perspective views of an embodiment of an anvil suitable for use with the mould of the present invention.
Figure 4A:
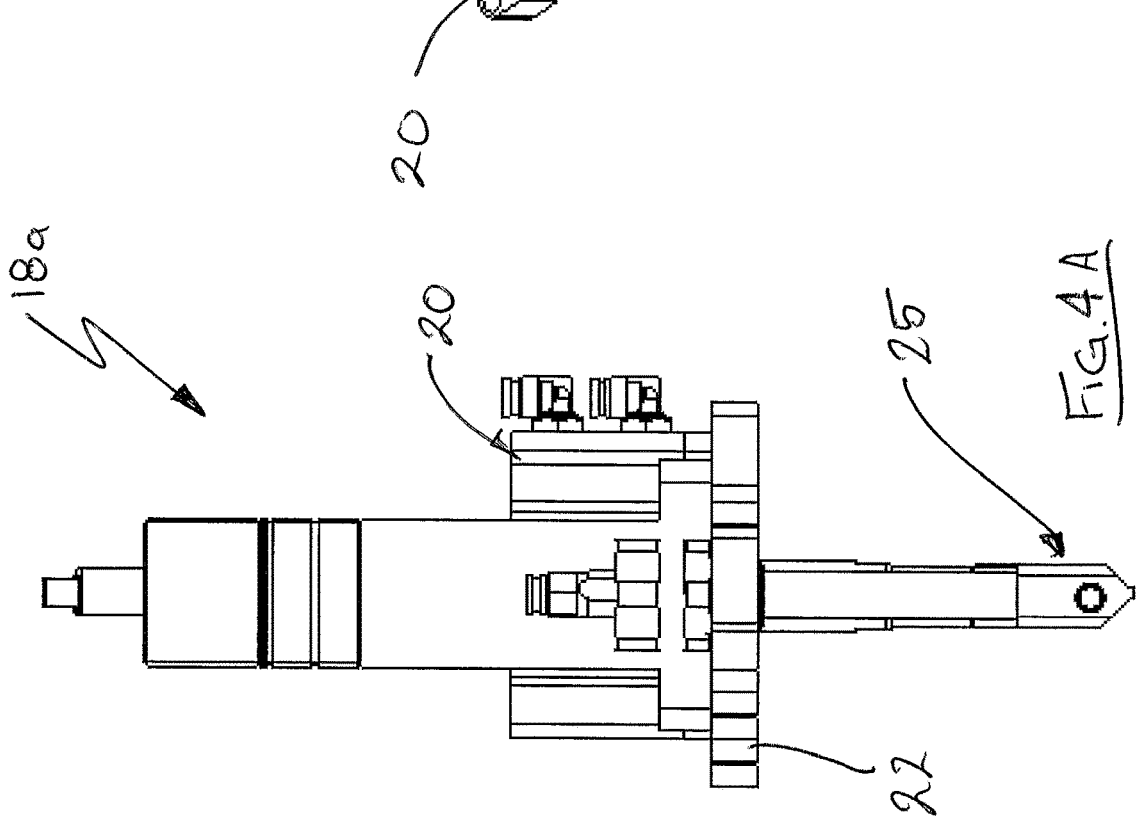

Referring to FIGS. 4A and 4B, one embodiment of an anvil 18a is depicted. The anvil 18a comprises a frame member 22 for mounting to an external surface of the mould 12, as depicted in FIG. 2. An actuator 20 is mounted on the frame member 22 and is activated to apply reciprocating motion to the anvil 18a such that the penetrating end 25 can extend into the mould cavity, to form the hinge 6. The reciprocating nature of the motion of the penetrating end 25 of the anvil 18a also enables the penetrating end 25 to be retracted out of the mould cavity after formation of the hinge 6.

Figure 5A:
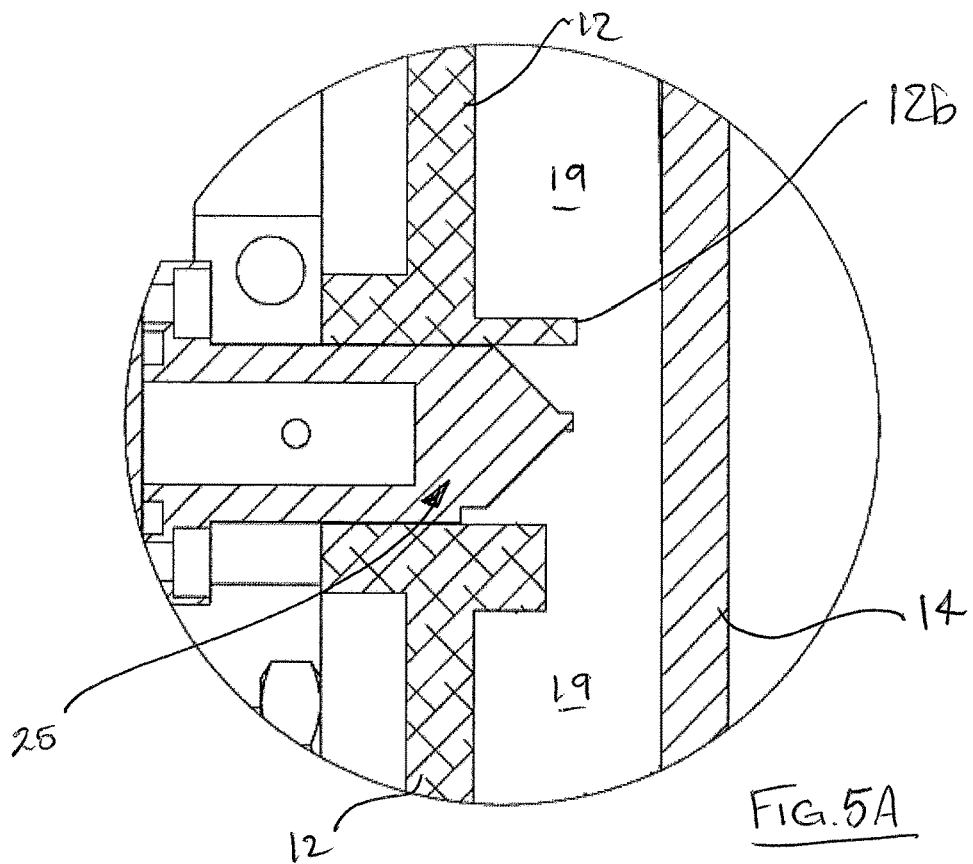
FIG. 5A and FIG. 5B show enlarged views of the movable anvil of FIG. 4A and FIG. 4B in use for creating hinges in the container formed from the moulds of FIGS. 1 and 2 in a retracted and extended position respectively.
Figure 5B:
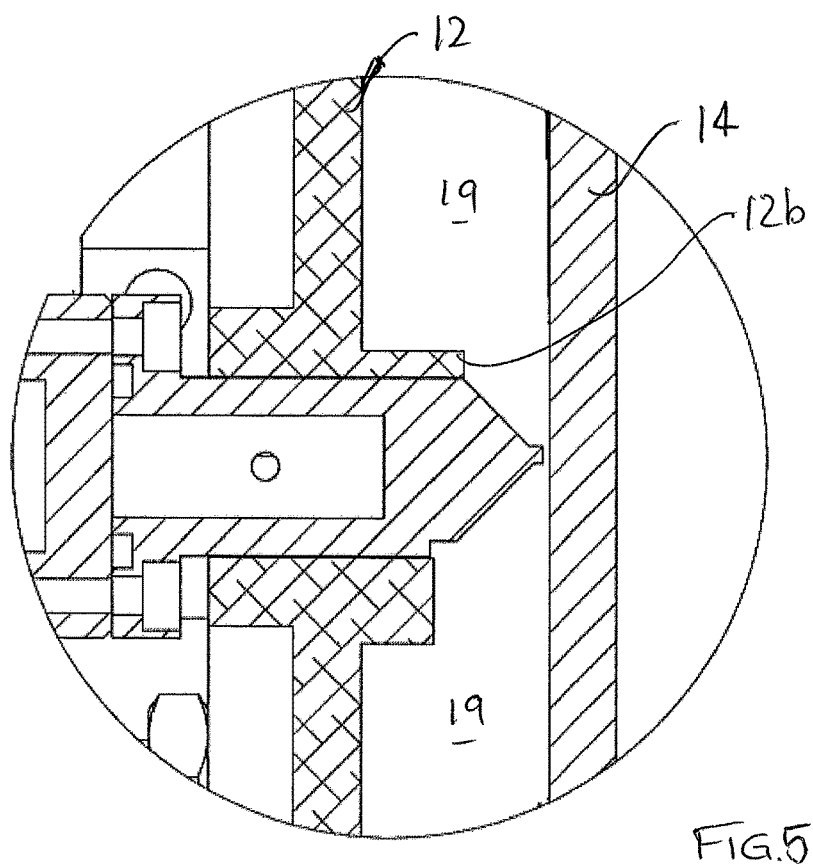

FIGS. 5A and 5B show the manner in which the hinges are formed for hinges that extend in the first plane of the moulded container 5 as shown in FIGS. 1 and 2. In this regard, these are the hinges formed between the base 2 and the end walls 4 of the container 5 shown in FIG. 3. FIG. 5A depicts the penetrating end 25 of the anvil 18a with the actuator 20 maintaining the penetrating end 25 in the retracted position whereby it is substantially contained within the inner wall of the first mould member 12 and doesn't substantially penetrate into the moulding cavity 19. Similarly, an extension 12b is provided on the inner wall of the first mould member 12 so as to form a chamber within which the penetrating end 25 of the anvil 18a travels. During the bead expansion process, the bead material expands so as to essentially fill the mould chamber 19 and extend into the chamber formed by the extension 12b. When the actuator 20 activates the anvil 18a, the triangular penetrating end 25 of the anvil 18a is moved into the mould cavity 19 to compress the material against the inner surface of the second mould member 14 in the manner as shown in FIG. 5B. This occurs prior to cooling of the material and when the material is still hot and malleable. Similarly to that described above, as the material within the chamber 19 formed by the extension 12b is isolated from the remainder of the material in the mould chamber 19, the anvil 18a is acting on free material and movement of this material into the hinge region is less likely to cause stress or shearing/tearing in the neighbouring region of the container body 5, which may manifest as a failure during assembly and/or use of the container 5.

Figure 6B:
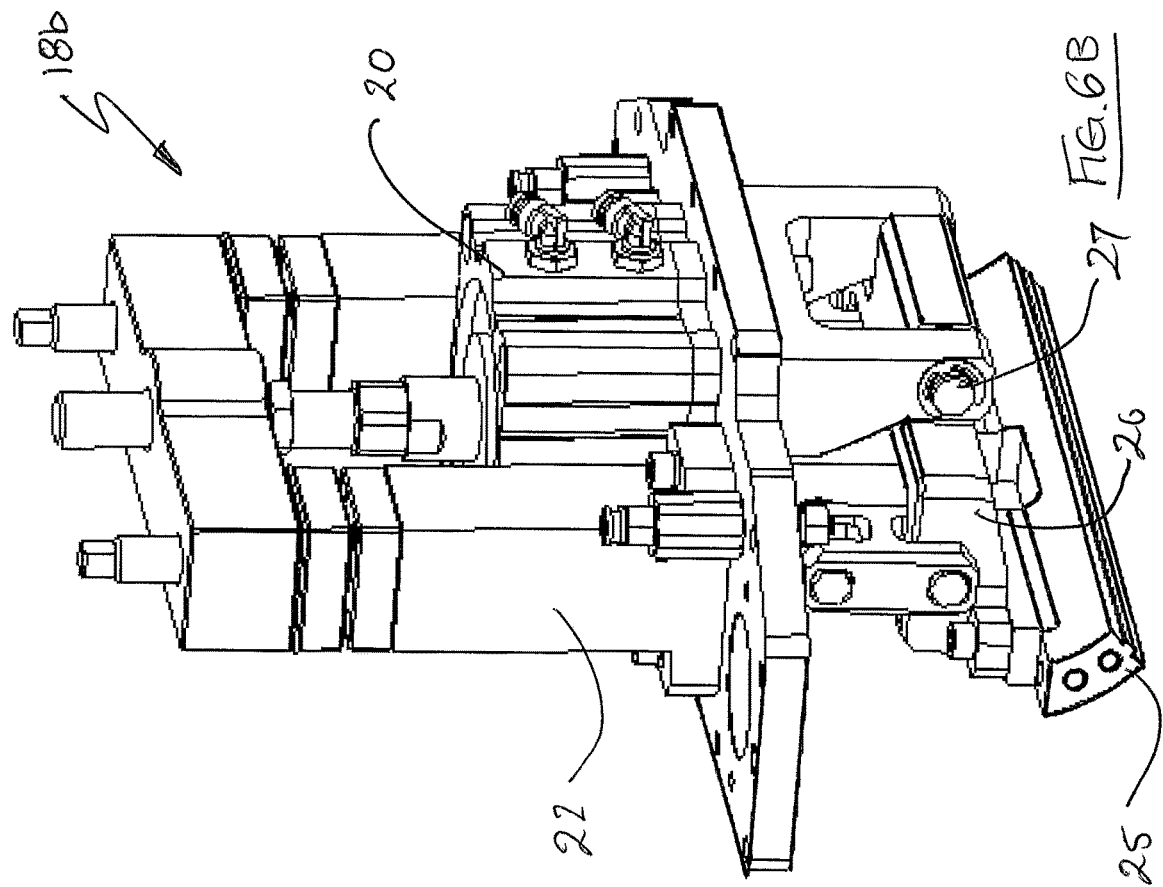
FIG. 6A and FIG. 6B show side and perspective views of an alternative embodiment of an anvil suitable for use with the mould of the present invention.
Figure 6A:
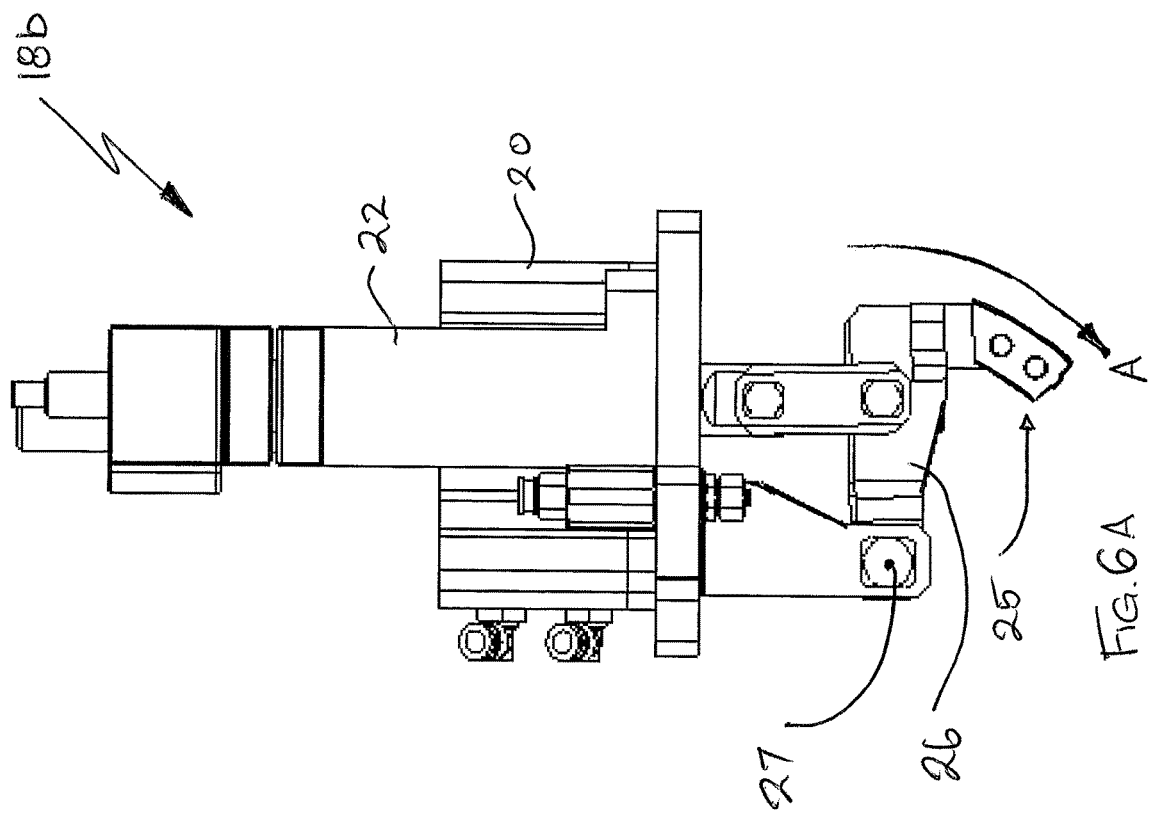

Referring to FIGS. 6A and 6B, an embodiment of an anvil 18b is depicted. The anvil 18b comprises a frame member 22 for mounting to an external surface of the mould 12, as depicted in FIG. 2. In this regard, the anvil 18b is configured to be mounted to the rear surface of the mould 12 such that it remains within the external perimeter of the mould to facilitate multiple moulds being mounted together in abutting fashion within a machine. An actuator 20 is mounted on the frame member 22 and is activated to apply reciprocating motion to the anvil 18b. However, in this embodiment of the anvil 18b, the anvil 18b has an arm member 26 that is mounted to extend orthogonal to the reciprocating motion of the actuator 20. The arm member 26 is mounted at one end thereof with respect to the frame member 22 so as to define a pivot point 27 about which the anvil 18b pivots. The other end of the arm member 26 comprises a penetrating end 25 of the anvil 18b mounted thereto at a downwardly extending angle. The penetrating end 25 has an arcuate body that is able to rotate within a passage formed through the mould 12 to enter the mould and form the hinge 6 through penetration of the distal face portion thereof, in a manner to be described in more detail below.

Figure 7A:
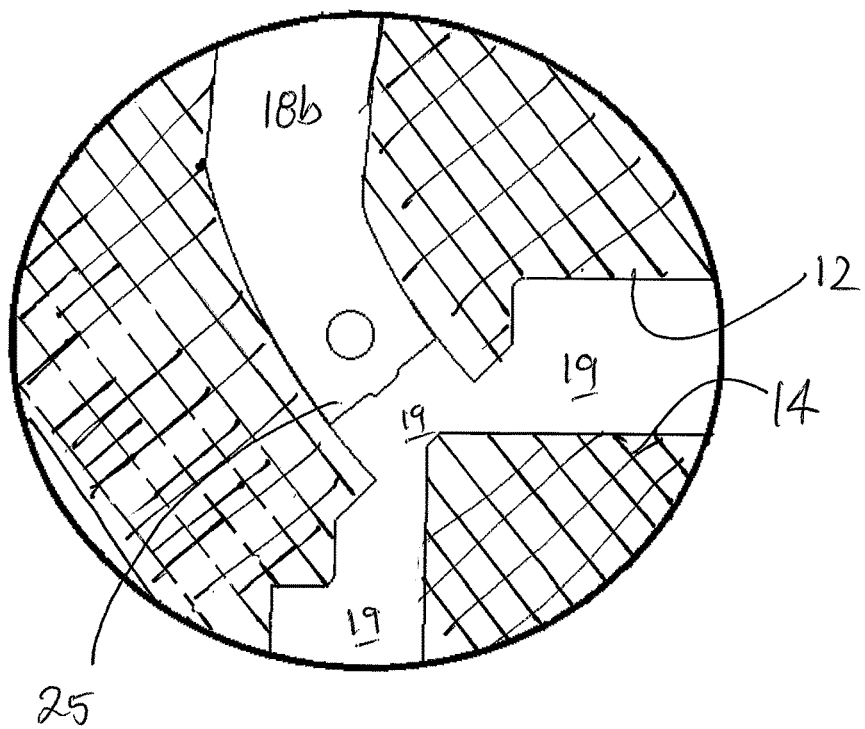
FIG. 7A and FIG. 7B show enlarged views of the movable anvil of FIG. 6A and FIG. 6B in use for creating hinges in the container formed from the moulds of FIGS. 1 and 2 in a retracted and extended position respectively.
Figure 7B:
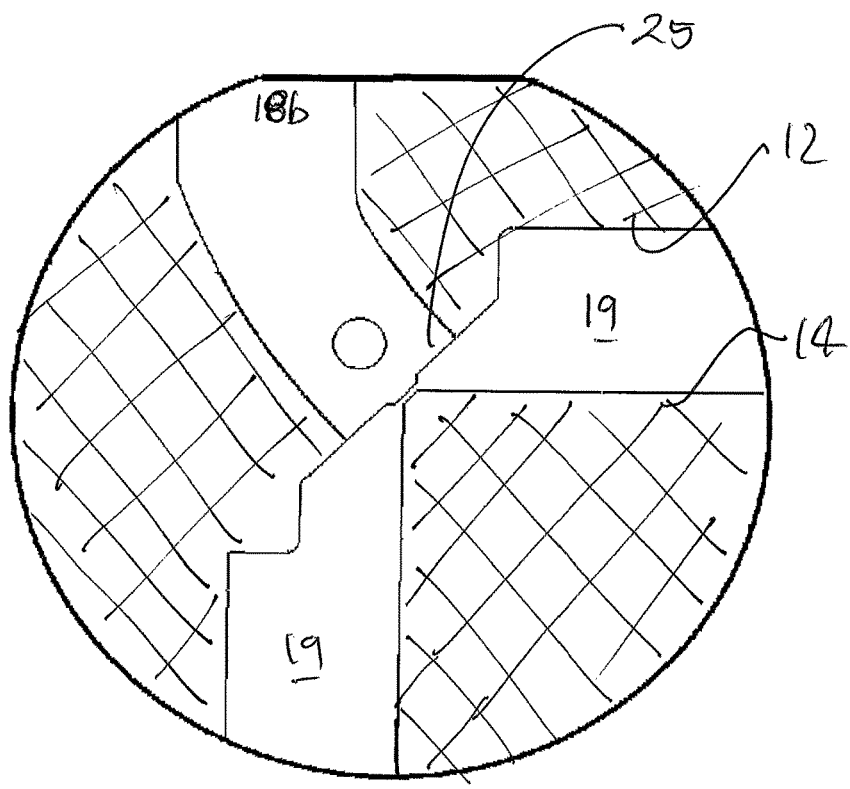

FIGS. 7A and 7B show the manner in which the penetrating end 25 of the anvil 18b of FIGS. 6A and 6B is able to form the hinges 6, namely those hinges that extend between the first and second planes of the moulded container 5 as shown in FIGS. 1 and 2. In the specific embodiment of the container 5 as depicted in FIG. 3, these hinges 6 are the hinges formed between the end walls 4 and the lid members 7 and the side walls 3 and the base 2 of the container 5. These hinges are essentially located along the edges of the moulded container 5 when formed in the inside-out manner of the present invention.

In FIGS. 7A and 7B, the inner wall of first or female mould member 12 and the inner wall of the second or male mould member 14 is depicted. The region therebetween is the mould cavity 19 and it is this region within which the EPS expands and fuses in the presence of steam to form the container 5. FIG. 7A depicts the penetrating end 25 of the anvil 18b in a retracted position such that it is within a passage formed in the inner wall of the first mould member 12. As shown, the end of the penetrating end is able to rotate within the passage formed in the first mould wall such that it is able to apply force in an orthogonal direction to the expanded bead material against the inner wall of the second mould member 14. During bead expansion in FIG. 7A, the bead material expands so as to essentially fill the mould chamber or cavity 19 and extend into the passage into which the penetrating end 25 is contained. When the actuator 20 is activated, the anvil 18b is caused to move in a rotational manner about pivot point 27, thereby causing the penetrating end 25 to travel within the passage and to a final extended position within the mould chamber 19, as shown in FIG. 7B. Whilst the movement of the anvil 18b is in a rotation or pivoting manner, due to the large diameter of the pivot movement the penetrating head 25 of the anvil 18b applies almost linear compression at the hinge point, thus eliminating shear forces being generated within the material. This causes the penetrating end 25 to compress the material against the inner surface of the second mould member 14 in the manner as shown in FIG. 7B. The angle of movement of the penetrating end 25 of the anvil 18b is in a substantially orthogonal direction thereby reducing any shearing effect between the material and the penetrating head 25 of the anvil 18b. This penetration of the anvil 18b occurs prior to cooling of the material and when the material is still hot and malleable. As the material within the passage is isolated from the remainder of the material in the mould chamber, the penetrating end of the anvil 18b is acting on free material and movement of this material into the hinge region is substantially linear in nature and is thus less likely to cause stress or shearing/tearing in the neighbouring region of the container body 5, which may manifest as a failure during assembly and/or use of the container 5. It will be appreciated that an alternative for the rotary anvil arrangement which maintains the anvils within the footprint of the mould members 12, 14 would be to provide a linear anvil with a penetrating head 25 having an angled face, for example a face angled approximately 45° to the vertical. However, such a linear anvil generates significant shear stresses in the material about the region where the hinge 6 is formed which has been found to significantly reduce the strength of the hinge 6 that is formed. Thus it is the ability to configure the anvils 18 such that the penetrating heads 25 thereof provide linear compression at the hinge that ensures maximum strength at the hinge.

In each of the above described embodiments, it will be appreciated that the anvils 18a and 18b are each caused to penetrate into the material present in the mould chamber or cavity 19 when that material is at a high temperature. This, through continuing use of the anvils each mould cycle, the external surface of the anvil 18 will become very hot. As the anvil 18 is typically made from a metal, such as steel or aluminium, it is able to retain heat. Therefore, over many cycles it is possible for the surface of the anvil 18 to become very hot such that when it is caused to compress the material the heat of the external surfaces of the anvil may burn the material and damage the material. This can have a detrimental effect on the structural integrity of the material, as well as the aesthetic appeal of the moulded container, with discoloration of the material being possible in the region of the hinges.

Figure 8:
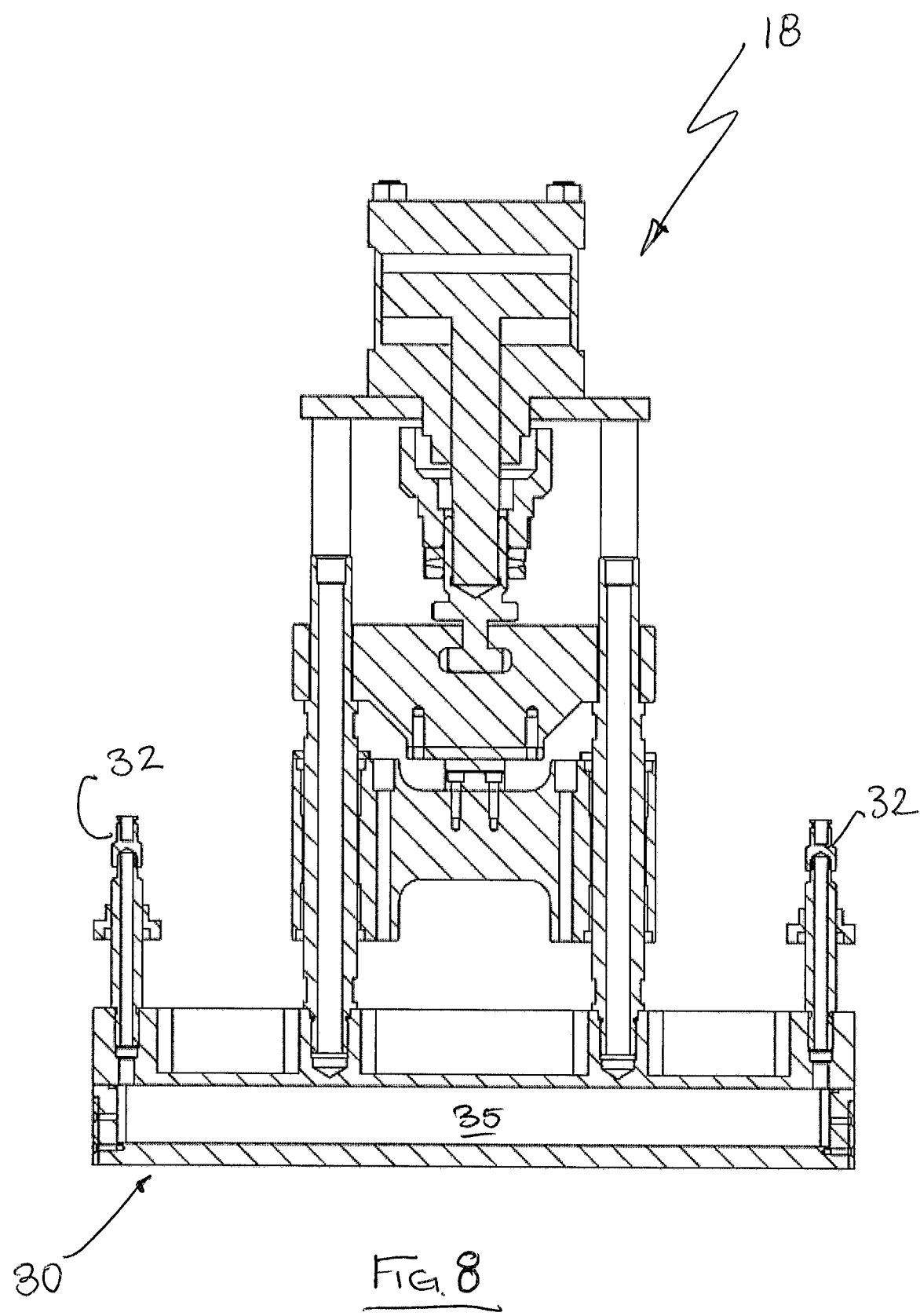
FIG. 8 shows a front view of the anvil of FIG. 4 in cross section.

To address this problem, each of the anvils 18 may be constructed in the manner as shown in FIG. 8. The penetrating end 30 of each anvil 18, namely the end that comes into contact with the material in the mould chamber 19 and compresses that material, may have a hollow cavity 35 with a pair of connectors 32 formed at opposing ends thereof. Each of the connectors 32 may be in fluid communication with the hollow cavity 35 and may be configured such that they can be simply connected to a water, air or steam system so as to deliver water/air/steam into the hollow cavity 35 to alter the working temperature of the anvil 18 with respect to the remainder of the moulding machine.

As discussed above, this can be done to cool the external surface of the anvil 18 to avoid burning of the material present in the mould chamber 20. Alternatively, if the anvil is too cold, which may occur at the start of a working cycle, steam or hot air can be provided to the hollow cavity to increase the working temperature of the anvil such that it can operate at an optimised working temperature throughout the working cycle. By providing a facility whereby the hinge region of the mould 10 can be temperature controlled independently of the general moulding cycle, it is possible to vary the hinge making process to ensure maximum strength at the hinge. This may be achieved by increasing or reducing the temperature of the working surface of the anvil 18, or experimenting with different combinations of temperatures until optimum strength is realised, which is not possible when the temperature of the anvil is dependent on the moulding cycle.

It will be appreciated that the system and apparatus of the present invention provides a means for forming a container or similar structure from expandable material that creates a substantially flat and foldable blank through a three-dimensional moulding process. The container is moulded in an expanded and inside-out form with hinges created during the moulding process by movable anvils that compress the material in a linear manner at the hinge and which can be independently temperature controlled if required. The moveable anvils are contained within the footprint of the mould members and the penetrating ends of the anvils essentially travel within a passage or chamber such that during use, the anvil is isolated from the remaining parts of the container body so as to prevent shear stresses being generated in the final container body which may cause cracks or tears in the material structure. This causes the beads in the hinge to compress to accommodate the excess beads being introduced into this region to enable the beads to then be cooled and retained in position in a highly dense manner, thereby creating a stronger, more robust hinge, not merely a region of thinner or weaker material.

By making the foldable blank in an inside-out and 3-Dimensional manner, the number of blanks, and ultimately boxes, that can be produced per moulding cycle on a given machine is maximised through maximising use of the platen space. Rather than having to mould a lid and a base for a box as separate items spaced apart on the platen, the components can each be formed together as an attached unit but one which is in a three dimensional plane with the lids and sides folded perpendicular to the base.

Throughout the specification and claims the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

It will be appreciated by those skilled in the art that many modifications and variations may be made to the methods of the invention described herein without departing from the spirit and scope of the invention.

The invention claimed is:

1. A mould for forming a collapsible container from an expandable material, the container comprising, when assembled, at least a base and two pairs of side walls extending at right angles from opposing sides of the base, the mould comprising:
   a first mould member and a second mould member movable with respect to each other between an open and a closed moulding position to define a mould cavity within which the expandable material expands to form said container; and
   a plurality of anvils, each anvil mounted on a rear surface of at least one of the first mould member and/or second mould member such that each anvil of the mould is contained within a perimeter of the rear surface of the first mould member and/or second mould member, each anvil being movable so as to be extended into the mould cavity so as to form one or more hinges in the expandable material at predetermined locations within the mould cavity;
   wherein the mould cavity defined by the first mould member and the second mould member is a three-dimensional representation of an inside-out configuration of the assembled container.

2. A mould according to claim 1, wherein each of the anvils is configured to be movable to apply substantially linear compression of the expandable material to form said hinges at the predetermined locations thereof.

3. A mould according to claim 2, wherein at least one of the anvils is a linear moving anvil that is activated to move in a linear direction to form one of said hinges at one of the predetermined locations.

4. A mould according to claim 3, wherein the linear moving anvil is mounted within a linear recess formed through either the first mould member or second mould member so as to extend into the mould cavity.

5. A mould according to claim 3 wherein the linear moving anvil is for forming said hinges in a central region of the mould cavity.

6. A mould according to claim 2, wherein at least one of the anvils is a rotary moving anvil that is activated to move in a rotary direction to form one of said hinges at one of the predetermined locations.

7. A mould according to claim 6, wherein the rotary moving anvil is mounted within an arcuate recess formed through either the first mould member or second mould member so as to extend into the mould cavity to apply substantially linear compression of the expandable material at the one of the predetermined locations.

8. A mould according to claim 6, wherein the rotary moving anvil is for forming said hinges along edges of the mould cavity.

9. A mould for forming a collapsible container from an expandable material, the container comprising, when assembled, at least a base and two pairs of side walls extending at right angles from opposing sides of the base, the mould comprising:
   a first mould member and a second mould member movable with respect to each other between an open and a closed moulding position to define a mould cavity within which the expandable material expands to form said container; and
   a plurality of anvils arranged on a rear surface of at least one of the first mould member and/or the second mould member such that all of the anvils on the mould are positioned such that the anvils do not extend outside of a perimeter of the mould and configured to permit multiple moulds to be arranged in an abutting manner, each anvil being movable so as to be extended into the mould cavity so as to form one or more hinges in the expandable material at predetermined locations within the mould cavity;
   wherein the mould cavity defined by the first mould member and the second mould member is a three-dimensional representation of an inside-out configuration of the assembled container.

10. A mould according to claim 9, wherein each of the anvils is configured to be movable to apply substantially linear compression of the expandable material to form said hinges at the predetermined locations thereof.

11. A mould according to claim 10, wherein at least one of the anvils is a linear moving anvil that is activated to move in a linear direction to form one of said hinges at one of the predetermined locations.

12. A mould according to claim 11, wherein the linear moving anvil is mounted within a linear recess formed through either the first mould member or second mould member so as to extend into the mould cavity.

13. A mould according to claim 11 wherein the linear moving anvil is for forming said hinges in a central region of the mould cavity.

14. A mould according to claim 10, wherein at least one of the anvils is a rotary moving anvil that is activated to move in a rotary direction to form one of said hinges at one of the predetermined locations.

15. A mould according to claim 14, wherein the rotary moving anvil is mounted within an arcuate recess formed through either the first mould member or second mould member so as to extend into the mould cavity to apply substantially linear compression of the expandable material at the one of the predetermined locations.

16. A mould according to claim 14, wherein the rotary moving anvil is for forming said hinges along edges of the mould cavity.

* * * * *